US010353847B2

(12) United States Patent
Lenz, Jr. et al.

(10) Patent No.: US 10,353,847 B2
(45) Date of Patent: Jul. 16, 2019

(54) FIREFIGHTING OR RESCUE APPARATUS INCLUDING A MEMORY DEVICE TO STORE AND PROVIDE ACCESS TO APPARATUS INFORMATION

(71) Applicant: HME, Incorporated, Wyoming, MI (US)

(72) Inventors: Kenneth C. Lenz, Jr., Hudsonville, MI (US); James F. Symonds, Grandville, MI (US)

(73) Assignee: HME, Incorporated, Wyoming, MI (US)

( * ) Notice: Subject to any disclaimer, the term of this patent is extended or adjusted under 35 U.S.C. 154(b) by 223 days.

(21) Appl. No.: 15/466,204

(22) Filed: Mar. 22, 2017

(65) Prior Publication Data

US 2017/0340910 A1     Nov. 30, 2017

Related U.S. Application Data

(60) Provisional application No. 62/341,375, filed on May 25, 2016.

(51) Int. Cl.
*A62C 27/00*     (2006.01)
*G06F 13/40*     (2006.01)
*G06F 13/16*     (2006.01)
*B60R 7/06*      (2006.01)

(52) U.S. Cl.
CPC .......... *G06F 13/4068* (2013.01); *A62C 27/00* (2013.01); *G06F 13/16* (2013.01); *B60R 7/06* (2013.01)

(58) Field of Classification Search
CPC ......... A62C 27/00; A62C 29/00; A62C 35/00; G07C 9/00944; G07C 2009/00952; B60K 2350/108; B60R 11/0252; B60R 11/0288; B60R 2011/0288; B60R 2011/0005; B60R 7/06; A45C 2011/188; G60K 19/077732; G06F 1/181; G06F 13/4068; G06F 13/16
USPC ........ 169/24; 206/320, 528–540; 296/70–74, 296/37.12
See application file for complete search history.

(56) References Cited

U.S. PATENT DOCUMENTS

| 5,541,840 A | 7/1996 | Gurne et al. |
| 7,448,905 B1 * | 11/2008 | Lin .......................... A61J 1/03 206/537 |
| 2002/0198997 A1 | 12/2002 | Linthicum et al. |

(Continued)

FOREIGN PATENT DOCUMENTS

DE     102008059246 A1 *   5/2010    ......... G07C 9/00944

*Primary Examiner* — Arthur O. Hall
*Assistant Examiner* — Tuongminh N Pham
(74) *Attorney, Agent, or Firm* — Warner Norcross + Judd LLP

(57) ABSTRACT

A firefighting or rescue apparatus includes a frame having a cab defining an interior within which a flash memory device is permanently mounted. The flash memory device is isolated so that it is incapable of receiving any onboard operating data pertaining to the operation and status of the firefighting apparatus. Instead, the device primarily stores data regarding a service manual, maintenance manual, electrical diagrams and/or troubleshooting guide related to the firefighting apparatus. The device is able to be selectively coupled to a portable computing device so that a user working on the firefighting apparatus can access the data without risk of loss or misplacement thereof.

20 Claims, 6 Drawing Sheets

(56) References Cited

U.S. PATENT DOCUMENTS

2009/0218108 A1* 9/2009 Cano ................... A62C 27/00
                                                169/24
2009/0292416 A1   11/2009 Ubik et al.
2010/0205622 A1*  8/2010 Snider ................. H04B 1/082
                                                720/652

* cited by examiner

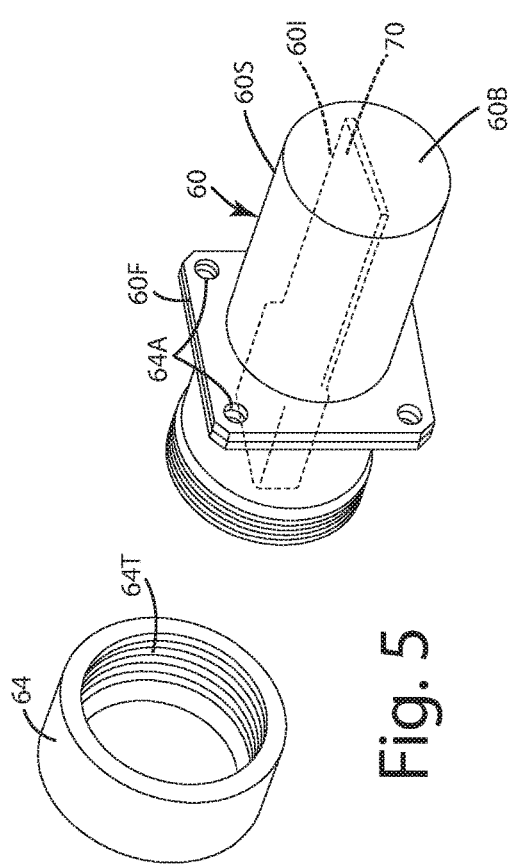
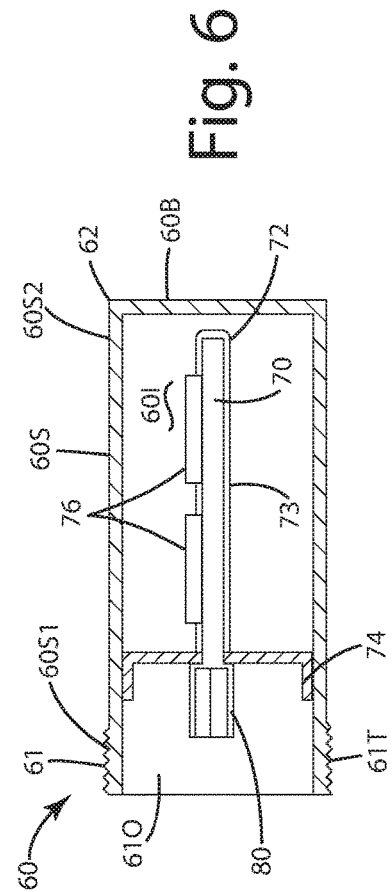

FIREFIGHTING OR RESCUE APPARATUS INCLUDING A MEMORY DEVICE TO STORE AND PROVIDE ACCESS TO APPARATUS INFORMATION

BACKGROUND OF THE INVENTION

The present invention relates to a firefighting apparatus, such as a fire truck, a trailer or other vehicles, and more particularly to a firefighting apparatus with an integrated memory device that stores and provides access to data and information regarding the firefighting apparatus.

Because they are so costly, fire trucks and rescue vehicles typically are designed to last many, many years. To aid in their longevity, most trucks are routinely serviced and maintained. To do so, service and maintenance personnel typically refer to one or more service and/or maintenance manuals regarding the trucks. They may also refer to troubleshooting guides to analyze issues with the truck.

Firetruck manuals and guides typically are provided by firetruck manufacturers to fire departments and other purchasing entities in bound, multipage paperback form. Frequently, these paper manuals are shipped with the trucks upon first delivery of the truck. Over time, the manuals usually become soiled and torn after repeated use. The printed manuals are also costly to print and distribute, and difficult to update effectively. Many times, with various personnel working on a particular truck, the manuals become lost or misplaced, necessitating order of a new manual from the manufacturer. This can become costly for already cash strapped departments.

Accordingly, there remains room for improvement in the consistent provision and secure, permanent retention of manuals, guides and information related to firefighting apparatus.

SUMMARY OF THE INVENTION

A firefighting or rescue apparatus includes a frame having a cab defining an interior within which a flash memory device is permanently mounted.

In one embodiment, the flash memory device primarily stores data regarding a service manual, a maintenance manual, electrical diagrams, troubleshooting guides and/or other data and information pertaining to the firefighting apparatus. The device can be isolated so that it is incapable of receiving any onboard operating data pertaining to the operation and/or status of the firefighting apparatus.

In another embodiment, the flash memory device is able to be selectively coupled to a portable computing device so that a user working on the firefighting apparatus can access the apparatus information without risk of loss or misplacement thereof.

In still another embodiment, the flash memory device is in the form of an electronic (solid-state) non-volatile computer storage medium that can be electrically erased and reprogrammed or rewritten. Optionally, the storage medium can be read only in some applications so that it cannot be erased, reprogrammed or rewritten by users who access the data in the memory. In addition to being non-volatile, the flash memory device can offer fast read access times, and can be generally shock and heat resistant.

In yet another embodiment, the flash memory device can be totally isolated within a housing, with the only access being via a plug or socket in an access opening facing the interior of the cab. The housing can be mounted in the interior of the cab, optionally in the dashboard or near the driver space. This can provide easy and repeatably consistent access to the flash memory device and information stored therein regarding the firefighting apparatus.

In even another embodiment, the housing can be mounted in a mounting aperture defined in the dashboard or elsewhere in the cab interior. The housing can include a sidewall that bounds at least a portion of an interior compartment of the housing. The flash memory device can be disposed and protected within the interior compartment.

In a further embodiment, the housing can define an access opening providing access to the interior compartment. The access opening can be selectively occluded by a cover joined with the housing. In turn, this can provide another level of structural protection to the flash memory device.

In still a further embodiment, the housing can include a flange extending from the sidewall. The flange can be secured with fasteners and permanently mounted to the dashboard so that the housing is not removable from the dashboard without the use of tools.

The current embodiments provide a simple and effective construction that can permanently retain and store data and associated information, such as manuals, diagrams and guides, pertaining to a firefighting apparatus on the apparatus itself, thereby eliminating the likelihood that the information will be disassociated from the vehicle, lost or otherwise misplaced by personnel using the data. Because the flash memory device is a simple memory construction, and is isolated from all operating, electrical and network systems on the apparatus, it is easy to install and is unlikely to undergo any damage due to electrical faults or issues on the apparatus or within the onboard operating systems or networks. The device also is easily coupled to an external, portable computing device so that a user can readily display relevant information and the like to perform repair, maintenance, troubleshooting or other activities relative to the firefighting apparatus.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 5 is a front perspective view of the flash memory device and housing of the firefighting apparatus;

FIG. 6 is a section view of the housing and flash memory device; and

DESCRIPTION OF THE CURRENT EMBODIMENTS

Figure 1:
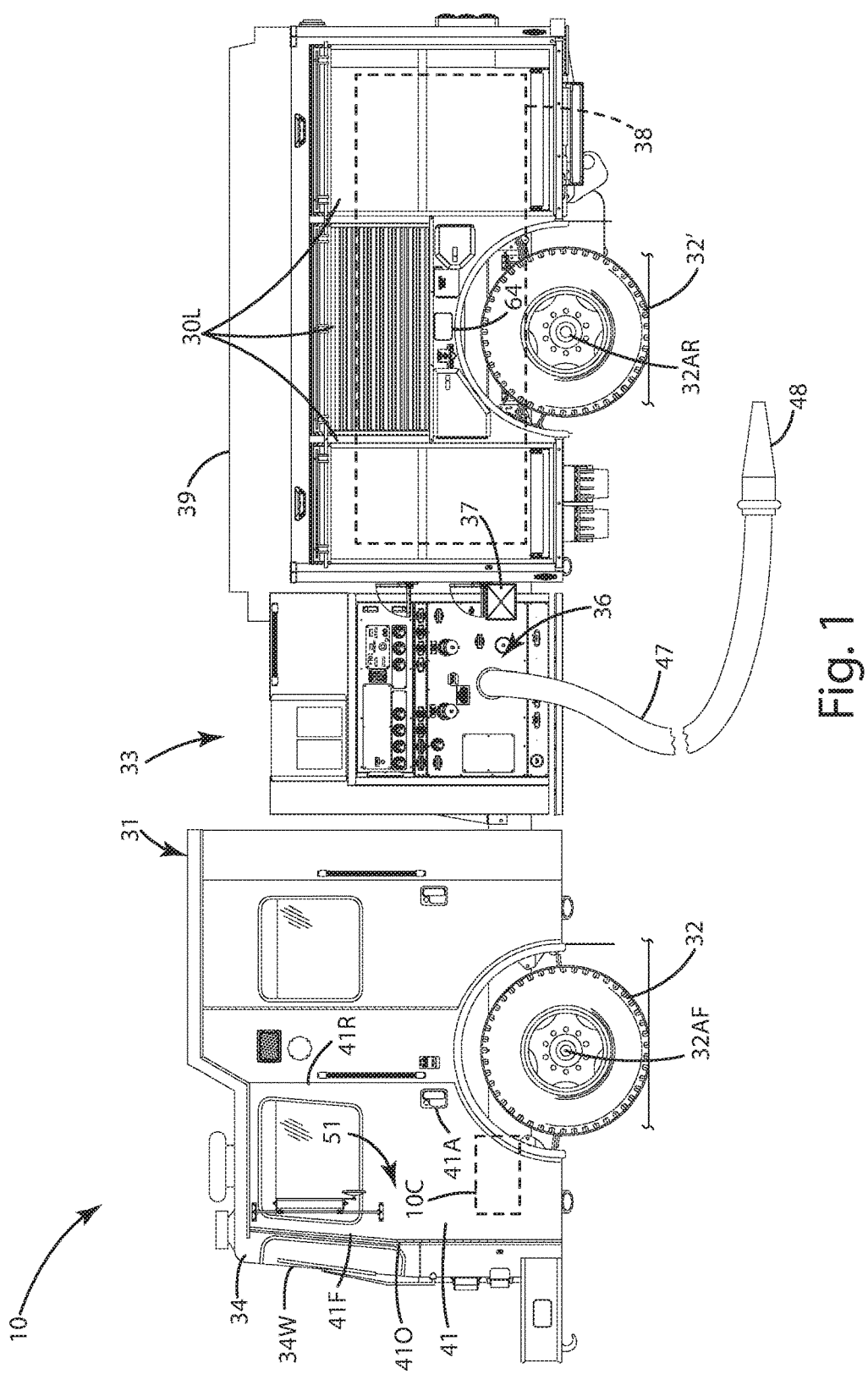
FIG. 1 is a side view of a firefighting or rescue apparatus in the form of a fire truck including a cab according to a current embodiment.
Figure 2:
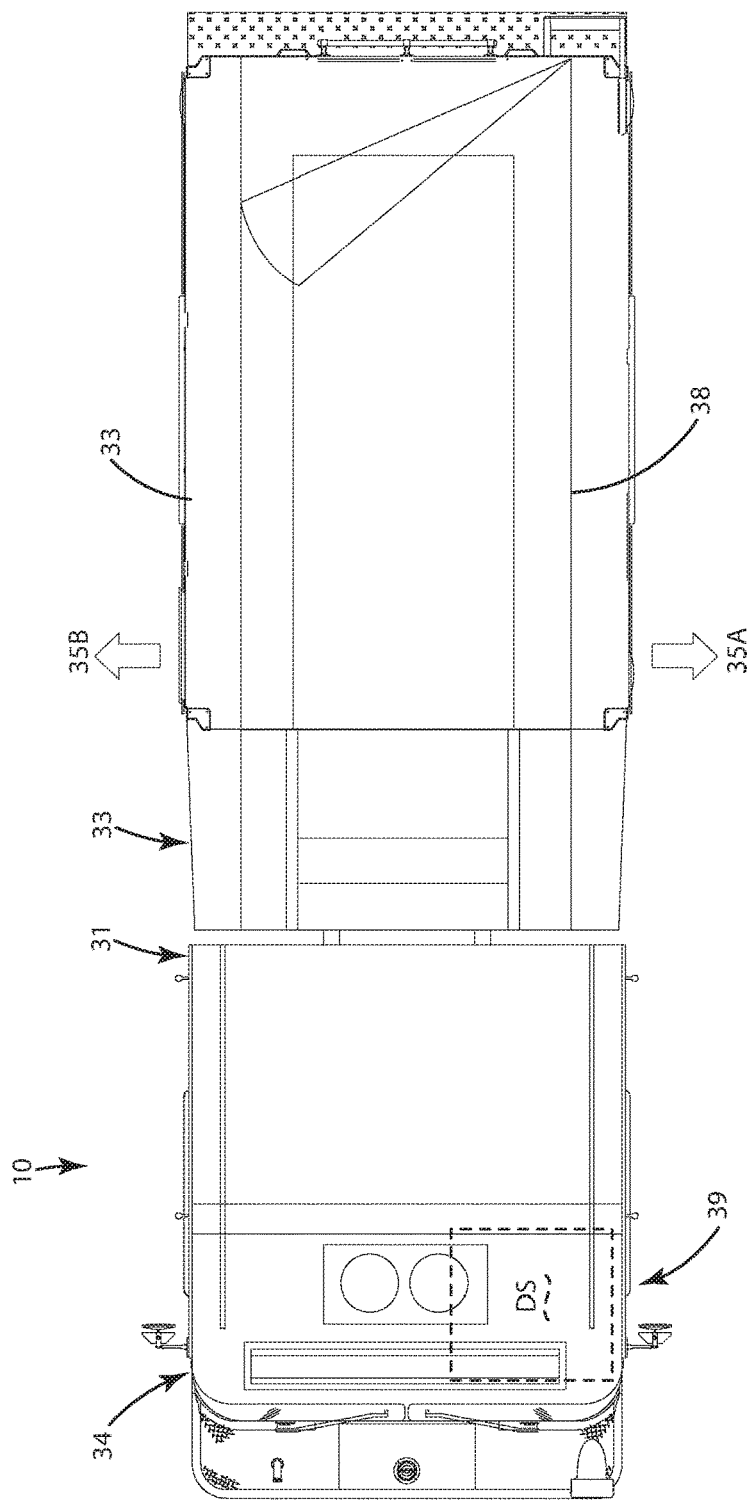
FIG. 2 is a top view of the firefighting apparatus.
Figure 3:
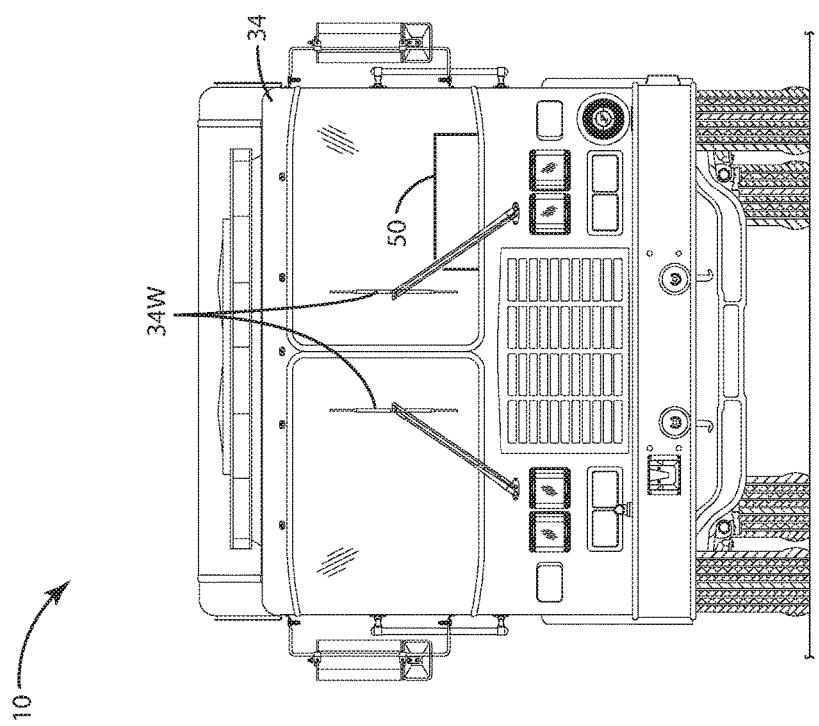
FIG. 3 is a front view of the firefighting apparatus.

A current embodiment of a firefighting apparatus is illustrated in FIGS. 1-7 and generally designated 10. The firefighting apparatus, referred to herein as a fire truck, can be a self-propelled vehicle, for example, a pumper truck as shown. Of course, although shown as a pumper fire truck, the firefighting apparatus optionally can be another type of fire truck, such as an aerial ladder truck, an emergency vehicle, a rescue vehicle and other modes of transportation such as tanker trucks or trailers, bush trucks, aerial ladder trailers or other equipment.

The fire truck 10 can include a frame, which can be mounted to a chassis which can be further mounted to multiple wheels 32. The wheels can be attached to conventional front 32AF and rear 32AR axles, which are further attached to the chassis of the truck. The fire truck can be mobilized via an internal combustion engine which drives the wheels via a transmission.

The fire truck 10 can include one or more onboard electronic devices, computing devices, computers, controllers, networks, electrical systems and/or circuits, collectively referred to herein as "onboard operating systems" 10C of the firefighting apparatus. These onboard operating systems can operate the engine, transmission, steering controls, pumps, monitoring components, gauges, ladders, turntables, and other accessories of the firefighting apparatus. Some may monitor and control the status and operation of various components of the firefighting apparatus. Others may regulate and control various electrical components, devices and accessories onboard the apparatus. Yet others might record the flow of signals and data relating to the operation and control of the apparatus and its components. Generally, the onboard operating systems are physically mounted on and remain on the apparatus during its useful life. Some of the systems, however, may be updated (via software updates or structural updates), replaced, repaired and/or serviced from time to time, in which case the systems can be detached or removed from the apparatus.

The frame 30 can include a forward portion 31 and a rearward portion 33 located at opposite ends of the fire truck 10. Generally the rear wheels 32' and their axle 32AR are located in the rearward portion 33 of the fire truck 10. The front or steering wheels 32 can be located in the forward portion 31 of the fire truck, and mounted to a front axle 32AF. The frame 30 in the forward portion 31 can include a cab 34. The cab 34 can house occupants, such as firefighters or rescue personnel, as they are transported to and from an emergency location. The cab 34 can include controls, such as a steering mechanism 34S and various displays inside the cab to monitor and evaluate the operation of the vehicle 10. The cab can terminate a distance of several feet rearward of the front wheels 32, or generally forward of the pump controls 36 and/or rearward portion 33 of the fire truck 10.

On the frame, rearward of the cab 34 a pump control panel 36 can be mounted. Under or behind the pump control panel 36, one or more pumps 37 can be mounted. These pumps can be mounted to the frame. Generally, the pump 37 can be in fluid communication with a firefighting fluid tank 38 mounted to the frame in the rearward portion 33, and/or a source of firefighting fluid external to the truck, such as a fire hydrant. The pump also can be in fluid communication with one or more hoses or waterways 47 as described below. The pump can be configured to convey firefighting fluid from the external source or the tank 38 to the hose 47 in a forced manner so that the firefighting fluid can be applied to a fire.

The hose 47 can be operable to transfer a continuous supply of firefighting fluid to the water outlet 48 which is generally in the form of a nozzle. Generally, the hose receives pressurized firefighting fluid from a pump 37 and storage tank 38 on the frame 30. A nozzle 48 assists in pressurizing and/or shaping the continuous stream of firefighting fluid from the hose 47 toward a fire in a burning building, in a vehicle or elsewhere.

In addition to the cab 34, the frame 30 optionally can include a body 39, rearward of the cab, having lockers 30L mounted rearward of the pump control panel 36, generally in the rearward portion 33 of the fire truck 10. The body can conceal all or a portion of the tank 38. The lockers 30L optionally can be located on and accessible from the first 35A and second 35B sides of the fire truck, and can be sized and configured to store supplies and equipment useful for easy access at an emergency location.

Figure 7:
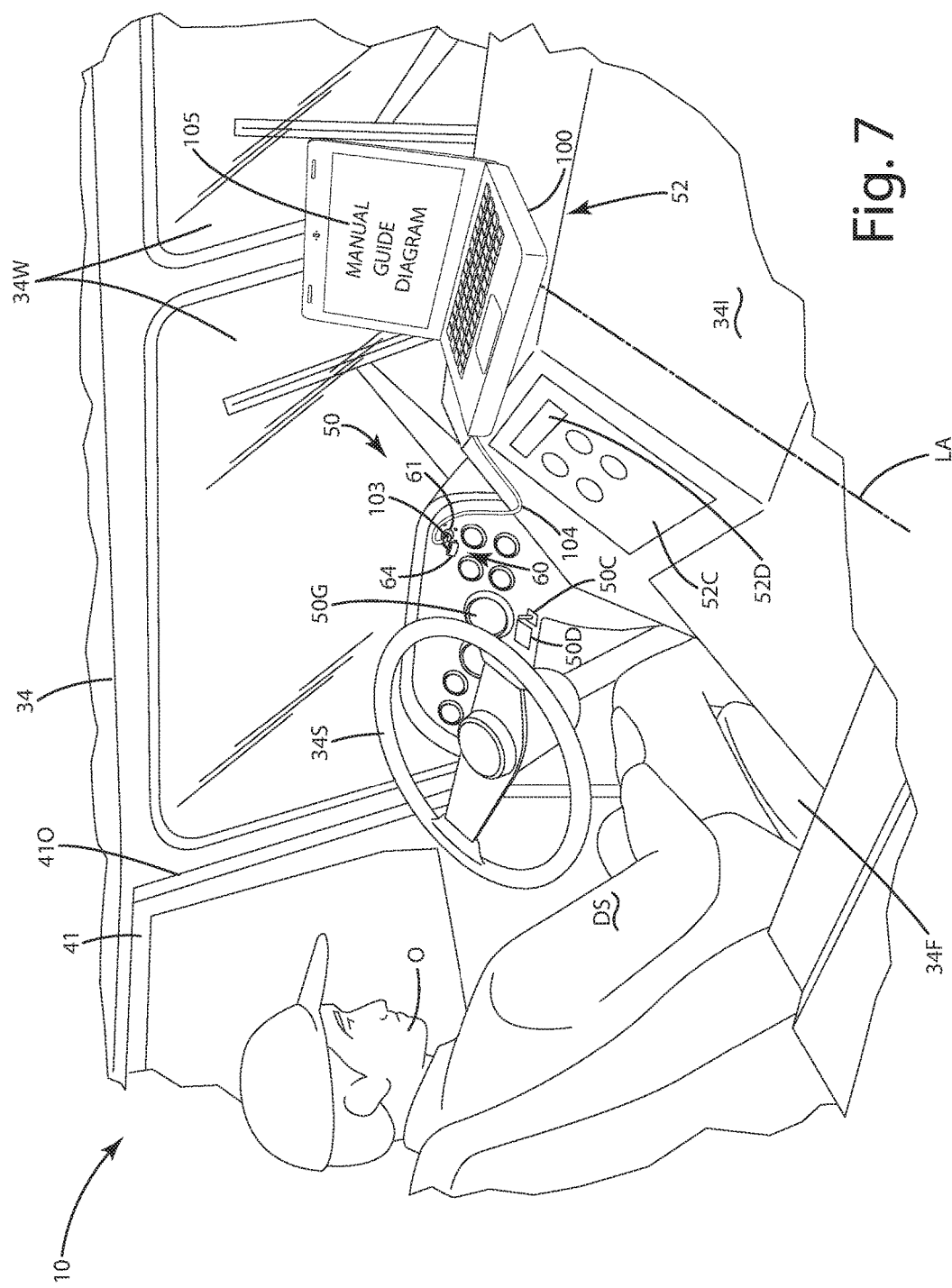
FIG. 7 is a perspective view of the firefighting apparatus with a portable computing device plugged into the flash memory device so that data stored in a memory of the flash memory device can be uploaded and displayed as information on a display of the portable computing device.

Turning now to FIGS. 1 and 7, the cab 34 can be located in the forward portion 31 of the frame 30. The cab can be adapted to house one or more occupants of the apparatus. Those occupants can be firefighters, drivers, rescue victims, officers, authorities or other personnel. Although referred to as an occupant, that phrase is not necessarily mean that the person is occupying or in the cab. Rather it may be that an occupant is a person standing upon the truck, for example on the body or on a platform, or a person waiting to board the truck, standing on the ground. The cab 34 can be configured to include one or more exterior doors on the first 35A and second 35B sides of the truck 10. As an example, on the driver side of the truck, a first door 41 can be disposed.

The first door 41 can be mounted in an opening 41O defined by the cab, and can be selectively opened and closed relative to the cab, to provide an occupant ingress and egress relative to a cab interior 34I. The first exterior door 41 can be located forward of the front axle 32AF and can provide access to a driver's seat or more generally the driver space DS of the apparatus.

The first door 41 can be swingably mounted to the cab via a hinge so that the door can swing open in the direction S1, generally toward the front of the truck and away from the front wheels 32 and cab 34. The door 41 can include a front edge 41F and a rear edge 41R. The door also can be outfitted with a handle 41A that is configured to open and close the door, providing a securing latch or lock mechanism so that the door remains shut when desired.

The cab 34 can include front windows 34W that provide visibility out from the cab and from the driver space DS and in general the cab interior 34I. The windows can be mounted forward of the driver space DS. The cab interior can be outfitted with one or more dashboards 50 and 52. The dashboard 50 can include one or more displays 50D, gauges 50G, controls 50C or other components to provide visual feedback to the occupant O, for example a driver or a technician, regarding operating parameters of the apparatus 10. As a further example, the gauges can be items such as tachometers, speedometers, oil pressure gauges, water temperature gauges and the like. The display can be an LCD screen. The control can be a switch, for example a toggle switch, configured to operate different components, such as lights, of the apparatus 10.

The second dashboard 52 can serve as a center console. It can optionally cover a portion of an engine or other components of the apparatus 10. The second dashboard 52 can include controls 52C and/or a display 52D. The second dashboard 52 can be adjacent the first dashboard 50. In some cases the two dashboards can be joined as a single, continuous dashboard. Generally, one or both of the dashboards 50 and 52 is displaced rearwardly of the front windows 34W, between the driver space DS and those front windows 34W. In this location, at least the dashboard 50 forwardly bounds the driver space DS. Further optionally, within the driver space DS a steering wheel 34S can be disposed. The steering wheel 34S can be mounted over and/or rearward of the dashboard 50, and generally forward of the seat 34F in the driver space DS. Although shown on the left side of the apparatus 10, the steering wheel and first dashboard 50, to be utilized by a driver, can alternatively be disposed on the right side of the apparatus 10, depending on the construction standards for vehicles in the country of use.

Figure 4:
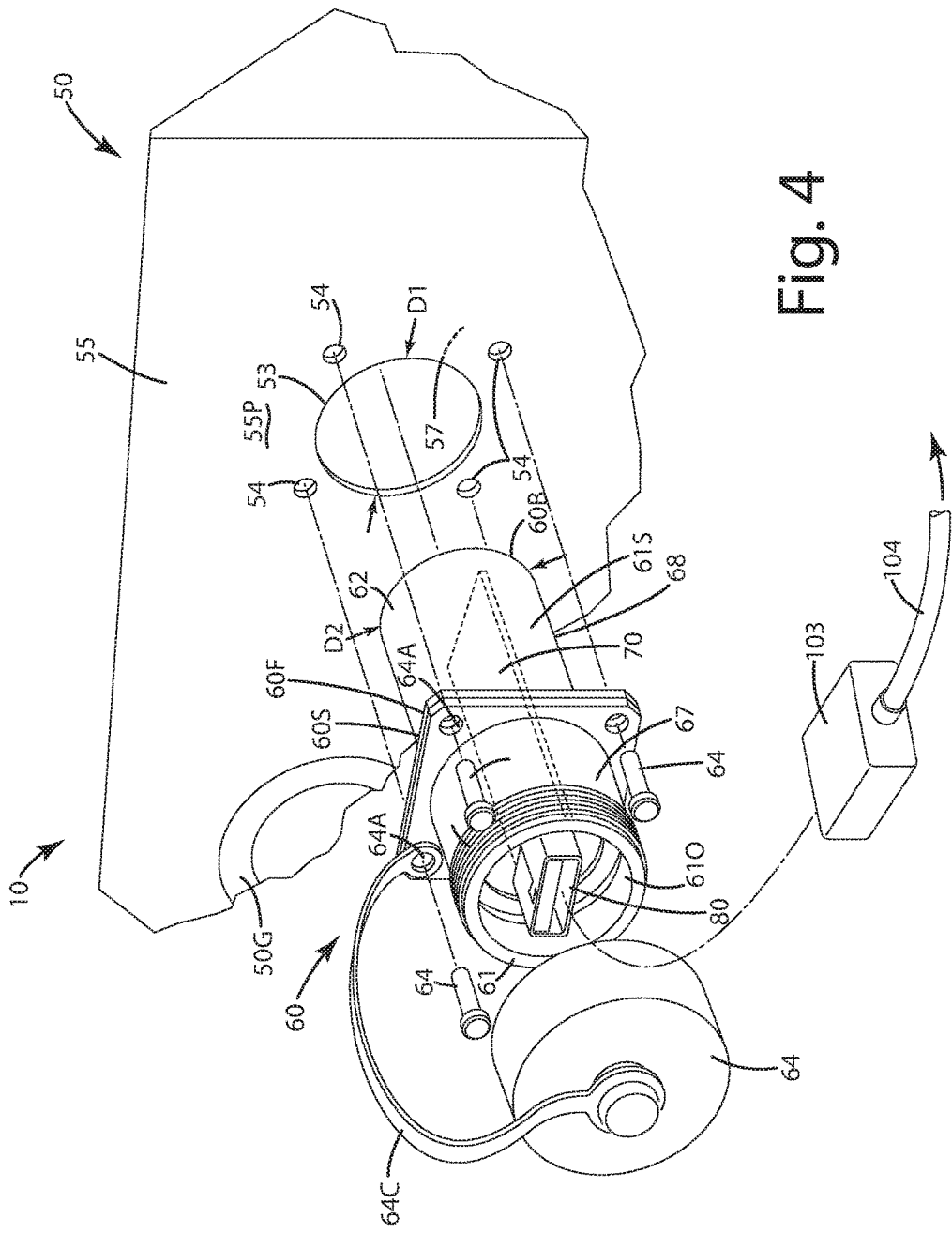
FIG. 4 is an exploded perspective view of a flash memory device and housing of the firefighting apparatus being installed relative to a dashboard of the firefighting apparatus.

As shown in FIG. 4, the dashboard 50 can include a rearward facing surface 55. This rearward facing surface 55 can generally face toward the driver space DS. This rearward facing surface 55 can include a mounting panel 55P. The mounting panel can be located in an upper portion, upper quadrant or upper half of the dashboard so that it and anything mounted to it are readily visible to an occupant in the driver space. This location can enable the occupant to readily identify that the truck is equipped with the present mounted flash memory device having manuals and instructions, and to quickly locate that helpful device. Optionally, the mounting panel can be disposed closer to or farther from a longitudinal axis LA of the fire truck than the steering wheel. Further optionally, the mounting panel and device can be located distal from and outside an engine bay or engine compartment of the apparatus 10.

The mounting panel 55P can define a mounting aperture 53. The mounting aperture as illustrated can be of a circular shape. Of course, depending on the application, the mounting aperture defined by the panel can be square, rectangular, polygonal or some other shape. Optionally, the mounting panel can also include one or more fastener holes 54, which can be configured to receive fasteners 64 as described further below. In some cases, the mounting panel 55P can be constructed from metal. In others, mounting panel can be constructed from a composite or polymeric material, optionally overlaid with padding, a cover, and/or an aesthetic appliqué. Further optionally, although shown in an upper portion of the dashboard, the mounting panel can be disposed in a lower portion, lower quadrant or lower half of the dashboard, or even under the dashboard. In some cases, the mounting panel can be disposed distal from the dashboard, somewhere else in the driver space, the cab interior, or elsewhere on the truck.

As mentioned above, the firefighting apparatus 10 can include a flash memory device 70 permanently mounted in the cab interior 34I. As shown in FIGS. 4-7, the flash memory device 70 can be fixedly and securely installed in a housing 60. The housing 60 can be constructed to define an interior compartment 60I within which the flash memory device 70 is housed or otherwise disposed. In particular, the housing 60 can be constructed to include a sidewall 60S. As shown, the sidewall is in the form of a cylindrical sidewall that circumferentiates all or a portion of the interior compartment 60I and optionally the flash memory device 70. Of course, in other applications, the housing can include multiple sidewalls, that form a polygonal, rounded, elliptical or other shape.

The sidewall and the housing 60 can extend from a first end 61 to a second 62. The first end 61 can be open, generally defining an access opening 61O. The second end, distal from the first end can be closed, and can include another wall, for example a bottom wall 60B. This bottom wall can be glued, welded, cemented, fastened or otherwise joined or formed with the second end 60S2 of the sidewall 60S. Optionally, the bottom wall 60B and sidewall 60S form a closed interior compartment 60I, which but for the access opening 61O, includes no other openings or holes at which through which to access or connect via hardwire the flash memory device 70. Further optionally, in some applications, there are no wires, cords or other communication/data transfer structural members extending out from the sidewalls and/or bottom wall from the interior compartment 60I, except those that extend through the access opening 61O alone.

As shown in FIG. 4, the first end 61 of the housing 60 can be configured to receive an optional cover 64. This cover can cover and conceal the contents of the interior compartment, for example the flash memory device 70. In turn, when installed, the cover can prevent dust, debris and other elements from inadvertently entering the interior compartment, possibly causing damage to the flash memory device 70 and/or an associated coupler. The cover 64 can include optional threads 64T that correspond to threads 61T disposed on the first end 61 of the housing and generally on the first end 61S1 of the sidewall 60S. In this manner, the cover can be threaded onto and secured to the housing, thereby closing off the access opening. If desired, the cover 64 can be joined with a tether 64C that is further joined with a component of the housing 60. In this manner, the cover 64 is less likely to be disassociated from the housing 60, lost or misplaced.

Optionally, the cover 64 can be configured differently, yet still close off the access opening 61O. For example, the cover can be a flip-top cover joined with the first end. As another example, the cover can be a sliding cover disassociated from the housing that slides over the access opening. As yet another example, the cover can be an elastic cover that tightly fits over the end of the housing to conceal the access opening. Other types of covers are contemplated.

The housing 60 optionally can include a flange 60F. The flange can extend outwardly from the sidewall 61S in multiple directions. The flange 60F optionally can circumferentiate housing 60 and in particular the sidewall 61S. As shown, the flange can be in the form of a rectangular plate. Of course, the plate can be of other shapes, such as circular or polygonal, depending on the application. The plate is secured to the housing 60 so as to separate the housing into a forward portion 67 and a rearward portion 68. The forward portion 67 can include the access opening 61O, and the rearward portion 68 can include the bottom wall 60B. Optionally, the forward portion 67 extends rearward of the dashboard panel 55P when the housing is installed in the mounting aperture 53 of the dashboard. The forward portion 67 can be visible when the housing is installed in the dashboard, while the rearward portion 68 can be hidden behind the mounting panel 55P, generally inside the dashboard.

The flange 60F can be welded, glued, cemented or otherwise fastened to the exterior of the sidewall 61S. The flange is securely and permanently affixed to the sidewall 61S in a predetermined location. The flange 60F also can define one or more apertures 64A that are configured to receive therethrough one or more fasteners 64. These fasteners 64 can be aligned with and can extend through the holes 54 defined by the mounting panel 55P when the housing is mounted to the mounting panel and dashboard. The fasteners can secure the housing 60 to the mounting panel and/or dashboard so that the housing 60 and any flash memory device therein is not removable from the mounting panel and/or dashboard without the use of tools. Optionally, the flange can be void of fastener holes, and the flange can instead be glued, cemented, welded, molded or otherwise fixedly secured to the mounting panel 55P of the dashboard. With any of these connections, the flange and generally the housing cannot be removed by the mounting panel or dashboard without the use of tools. Further optionally, the flange can be absent from the housing in the housing sidewall fixedly and permanently secured directly to the mounting panel 55P, and even further optionally not extending into any type of mounting aperture. This can be achieved via gluing, cementing, welding, molding or threading the housing directly to the mounting panel 55P.

As illustrated in FIG. 4, the diameter D1 of the mounting aperture 53 can be slightly larger than the outer diameter or dimension D2 of the housing 60. In this manner, the housing can easily fit through the mounting aperture 53. Optionally, there may be other layers, such as padding or aesthetic appliqués that include a similarly sized mounting aperture and are disposed adjacent the mounting panel 55P. In some cases, the padding or appliqué can extend over and conceal the mounting flange 60F. In other cases, the mounting flange can be mounted to the interior surface or forward facing surface 57 of the mounting panel 55P.

Optionally, the flange 60F can include a seal or bumper 60S. This seal can be disposed between the flange and the front surface of the mounting panel 55P when the housing is mounted to the panel. The seal can be constructed from an elastomeric material, such as rubber, silicone or some thermoplastic material. This can provide dampening to reduce the amount of vibration imparted to the flash memory device 70 disposed within the housing, thereby improving its longevity.

Generally, when the housing is installed in the dashboard 50, or optionally the dashboard 52, or somewhere else within the cab interior 34I, a portion of it, in particular the access opening 61O, is visible to and accessible by an occupant or user. Accordingly, the user can access the flash memory device 70 and upload or download or otherwise access data and information stored in memory on the flash memory device as further explained below.

As mentioned above, the housing 60 defines an interior compartment 60I. The flash memory device 70 can be disposed completely substantially entirely within that interior compartment 60I as shown in FIG. 6. The flash memory device 70 can be joined with the sidewall 60S of the housing using glue, cement, epoxy or some other polymer 72. Optionally, although not shown, the flash memory device 70 and its components can be completely embedded in and encapsulated by a plastic, epoxy and/or cement that fill a substantial portion of the interior compartment 60I.

The flash memory device can include a board or support substrate 73 to which one or more memory modules 76 are joined. The substrate can be further joined with a support ring 74 that optionally can center and support the substrate relative to the interior compartment 61I and sidewall 61S. The flash memory device and its memory modules also can be further electrically coupled to a coupler 80. The coupler 80 can be accessible through the access opening. The substrate and memory modules can be concealed behind the support ring 74 so they cannot be tampered with or inadvertently damaged. The coupler 80 can be configured so that it is disposed within and does not extend beyond the sidewall 60S, and optionally does not project beyond the first end 61 of the housing. Of course in other cases, the coupler 80 can extend beyond that end 61 beyond the sidewall, generally outward from the housing 60. As shown in FIG. 6, the coupler 80 can be disposed substantially entirely within the interior compartment 60I of the housing 60.

The coupler 80 can be universal serial bus (USB) coupler. For example, coupler 80 can be a USB plug capable of being electrically coupled to a USB socket of a portable computing device 100 as explained further below. Although not shown, the coupler 80 can be a USB socket capable of being coupled to a USB plug of the portable computing device. In other cases, the USB coupler and device in general could be modified for use with any suitable computer serial bus. For example, the device and coupler could be modified for use with IEEE 1394 (Firewire) protocol by substituting the USB coupler with a Firewire protocol compatible plug, interface device and socket respectively. The coupler 80 also can be modified to provide any other standard/proprietary interface to connect the flash memory device 70 to the portable computing device 100.

In some applications, the coupler 80 can be deleted. Optionally, in those applications, the access opening also can be closed off with another wall or top so that the flash memory device is fully contained and/or sealed within the interior compartment. The flash memory device can provide data to portable computing device 100, and/or the portable computing device can selectively access the data via wireless, RFID, Bluetooth, optical or other non-contact techniques. The data can be stored in the device 70, with the data accessed by the device 100. The device 70 can be passive during this access, and not actively transmitting the data but rather having the data uploaded at the command of the device 100 from device 70.

The flash memory device 70 optionally can include non-volatile solid state memory. Some optional non-volatile memory examples include ROM, such as Mask ROM, PROM EPROM, EEPROM, NVRAM, such as nvSRAM, FeRAM, MRAM, PRAM and/or any of 3D XPoint, CBRAM, SONOS, RRAM, NRAM, FJG RAM, and/or any combinations of the foregoing, depending on the application.

The flash memory device can be in the form of a variety of different flash memory devices and/or cards. Optionally, the flash memory device can any one of devices such as the CompactFlash (CF), the MultiMediaCard (MMC), Secure Digital (SD), miniSD, Memory Stick, SmartMedia and TransFlash cards, all commercially available from SanDisk Corporation of Milpitas, Calif. Although each of the foregoing has a unique mechanical and/or interface or coupler according to its standardized specifications (for example, The Universal Serial Bus (USB) specification, incorporated herein by reference in its entirety), the flash memory included in each can be similar. Other flash memory devices include a line of flash drives that are hand held memory systems in small packages that have a USB plug for connecting with a computing device by plugging into the computing device's USB socket. The flash memory device also can optionally include one or more controllers that interface with the computing device and control operation of the flash memory within it.

The flash memory device 70, and in particular its memory, stores data that is useful in maintaining, repairing and/or servicing the apparatus 10. For example, the memory of the flash memory device 70 stores data regarding a service manual concerning the firefighting apparatus. The service manual data can include information concerning routine and/or periodic service to the apparatus, such as oil changes, transmission fluid changes, coolant fluid changes, hydraulic operating diagrams, pump service, specifications and the like. The maintenance manual data can include information concerning upkeep and maintenance of the firefighting apparatus and its components and accessories. The electrical diagram data can include information regarding electrical diagrams for electrical systems, components and systems on the firefighting apparatus, diagrams and schematics regarding onboard operating systems and the like. The troubleshooting guide data can include information to enable a technician or other user to identify, address and/or correct problems with the firefighting apparatus. These problems may be associated with the physical components of the truck, such as the engine, transmission, pump, lights, onboard operating system or other items.

The service manual data, maintenance manual data, troubleshooting guide data, electrical diagram data and any other data in the memory of the flash memory device can be selectively uploaded to the portable computing device. All or part of the data is displayed in a human readable and/or cognizable format on a display 101 of the portable computing device interfacing and/or coupled to flash memory device 70. When displayed, the data can be in the form of repair, maintenance, service and troubleshooting resources in the form of textual service manuals, maintenance manuals, repair manuals, field instructions, schematics, block diagrams, and accompanying diagrams and images for the same, as well as the electrical diagrams and troubleshooting guides. This displayed data can be utilized by the user, who can be a technician, mechanic or other person skilled in or tasked with servicing, maintaining, repairing, troubleshooting or otherwise working on the firefighting apparatus 10.

The flash memory device 70 can be a standalone memory that is incapable of communicating with, transmitting data or signals to, or receiving data or signals from, any onboard operating system or other component of the apparatus. Instead, the flash memory device 70 can be dedicated solely to storing data regarding the information noted above. The flash memory device 70 can be fully electronically and electrically isolated from and/or out of communication with all onboard operating systems of the firefighting apparatus. Optionally, it is not connected via any wiring, Bluetooth, RFID, cellular, optical or other modes of connection or transmission to any of the onboard operating systems. Therefore, it does not receive any data from, nor transmit any data to, those onboard operating systems.

Further optionally, the only way data can be extracted from the flash memory device 70 is by connecting the portable computing device 100 via the coupler and/or otherwise transmitting information from the flash memory device to the portable computing device 100 as noted herein. The data in the flash memory device 70 also does not control, direct or backup any onboard operating system. The flash memory device 70 optionally is isolated so that it is incapable of receiving any onboard operating data pertaining to the operation and/or status of the firefighting apparatus. In this manner, the flash memory device 70 can be configured so it does not receive any diagnostic data, error codes, or default codes or the like from any onboard operating system component of the firefighting apparatus.

As described further below, the portable computing device 100 can be any small and manually portable computing device, for example, laptop and other portable computers, cellular telephones, personal digital assistants, image viewers, digital still cameras, digital movie cameras, portable audio players and the like. The portable computing device can include an interface 103 compatible with the coupler 80 so that data can be transferred via a hardwire 104 from the flash memory device 70 to the portable computing device 100. As mentioned above, the coupler 80 can be in the form of a USB plug. The interface 103 can be in the form of a socket. The socket can be joined with a hardwire or connector cord 104 that further plugs into and is in communication with the portable computing device 100. Optionally, in cases where the flash memory device 70 is sealed or fully physically isolated within the housing 70, the portable computing device can communicate via Bluetooth, cellular, or other wireless techniques with the flash memory device to obtain data therefrom.

In some cases, the portable computing device can only read data from the flash memory device and its memory. Optionally, the portable computing device cannot overwrite or write data and transfer it to the flash memory device. In other cases, the feature of over writing or writing data to the memory maybe suitable, particularly where repair, service and/or maintenance manuals are updated based on new information from the manufacturer of the firefighting apparatus and/or its components.

Further optionally, in some cases the portable computing device can have data uploaded to it from the flash memory device. This information can be stored in a memory of the portable computing device. In this manner, a user, such as a technician might not upload data from the flash memory device every time the user services or works on the firefighting apparatus. Instead, they can simply access the stored information on their portable computing device.

The personal computing device 100 can include a display 105. On this display, the data uploaded or transferred from the flash memory device 70 to the personal computing device 100 can be displayed. Generally, that data can be displayed in the form of text, images, diagrams, schematics, charts, videos, audio, and/or in any other form suitable for conveying information regarding the firefighting apparatus as mentioned above to the user.

Operation of the firefighting or rescue apparatus of the current embodiments will now be described. The firefighting apparatus 10, optionally in the form of a pumper fire truck, can be used to fight fires in a building or other structure. Usually, the fire truck is serviced or maintained on a routine basis. In cases where a component is broken or worn out, or the fire truck is damaged, a user, such as a technician or mechanic, troubleshoots and repairs the fire truck.

With the current firefighting apparatus 10, a routine service or maintenance activity can proceed as follows. The user O can enter the cab 34 of the driver space DS. The user O comes equipped with the portable computing device 100, which is separate from all onboard operating systems of the truck. The portable computing device can be truly portable. For example, it is not mounted on wheels but rather can be easily carried by the user O and can weigh less than about 20 pounds. The portable computing device also can be stored remotely from and not onboard the apparatus when not being used on the apparatus. Optionally, the portable computing device can be used by the user to access and utilize multiple flash memory devices on many different apparatus equipped with flash memory devices. In which case, the portable computing device is not associated with or left onboard any particular apparatus. Instead, it can be only temporarily and intermittently used on a particular apparatus and joined with an associated flash memory device.

The portable computing device 100 is powered on, and attached to a connector cord 104 having the USB socket mentioned above. The user O removes the optional cover 64 from the housing 60. This provides access to the USB plug 80. The user O can attach the USB plug 82 the USB socket 103 thereby establishing communication between the flash memory device 70 and the portable computing device 100.

When the flash memory device 70 is coupled to (or interfaces wirelessly with) portable computing device 100, an appropriate user interface can be launched based on an application stored in flash memory device 70. This user interface is shown on display 105 and can include appropriate forms, graphical information, video/audio messages, websites or other resources. The user interface enables the user to browse and search the data and associated information regarding the firefighting apparatus stored in the memory of the flash memory device.

Depending on the task of the user O, that user can select service manual information, repair manual information, maintenance manual information, troubleshooting guides, electrical diagrams or any other type of information relating to the firefighting apparatus. The user then goes about servicing, repairing, maintaining, troubleshooting or otherwise working on the firefighting apparatus based on the information displayed on the display 105. The user optionally can download the data provided via the flash memory device on the personal computing device.

After the fire truck 10 has been adequately worked on using the information stored in the flash memory device and conveyed to the portable computing device 100, the user can disconnect the connector cord 104 from the coupler and generally from the flash memory device. The cover 64 can be replaced on the housing 60 to conceal and protect the coupler 80 and generally the flash memory device. The portable computing device 100 can be completely removed from and transported distal relative to the apparatus. During all of the foregoing activity, the flash memory device can remain isolated from the onboard operating systems of the apparatus. It neither transmits nor receives any information from those onboard operating systems of the apparatus. Instead, it can primarily enable the user to access that information and review it on the personal computing device 100.

In general, a method of using the firefighting apparatus of the current embodiments can include: providing a housing mounted to a dashboard as noted above, the housing isolating a flash memory device therein from onboard operating systems; temporarily positioning a portable computing device in the cab of the firefighting apparatus; optionally coupling the flash memory device to the portable computing device brought onto the apparatus by a user; transmitting or otherwise conveying data stored in memory of the flash memory device to the portable computing device; displaying information relating to the data on a display of the portable computing device to the user while the portable computing device is connected to and/or accessing memory of the flash memory device; performing an operation on the firefighting apparatus based on the information; optionally decoupling the personal computing device from the flash memory device; and removing the portable computing device from the apparatus.

With the flash memory device of the firefighting apparatus installed generally permanently in the fire truck, optionally in the dash or cab, the helpful information associated with and stored in memory of the flash memory device can be consistently stored, accessed and utilized, without significant risk of losing or otherwise misplacing that information.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual elements of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination or any number of X, Y and Z, for example, X, Y, Z; X, Y; X, Z; and Y, Z.

The embodiments of the invention in which an exclusive property or privilege is claimed are defined as follows:

1. A firefighting apparatus comprising:
   a frame including a plurality of wheels configured to enable transportation of the apparatus to an emergency location, the frame including a cab defining an interior,
   a pump joined with the frame rearward of the cab, the pump adapted to pump liquid through a firefighting hose;
   a housing mounted in the cab, the housing defining an interior compartment, the housing including an access opening providing access to the interior compartment, the housing being fixedly and permanently mounted within the cab so that the housing is not removable from the interior of the cab without the use of tools; and
   a flash memory device including non-volatile solid-state memory that stores data regarding the firefighting apparatus, the flash memory device permanently mounted in the interior compartment of the housing, wherein the flash memory device is fully electronically isolated from all onboard operating systems of the firefighting apparatus, and wherein the flash memory device is configured so that a user can temporarily couple a portable computing device, brought temporarily onto the apparatus, to the flash memory device to selectively access and display the data regarding the firefighting apparatus, thereby enabling the user to perform work on the firefighting apparatus utilizing such data.

2. The firefighting apparatus of claim 1, wherein the flash memory device is joined with a coupler adapted to electrically couple the flash memory device to the portable computing device so that the data can be selectively displayed on a display of the computing device to a user thereof, wherein the coupler is a USB plug capable of being coupled to a USB socket of the portable computing device.

3. The firefighting apparatus of claim 2, wherein the data regarding the firefighting apparatus includes information concerning at least one of the pump, an engine, a transmission, a hydraulic system, and an electrical system of the firefighting apparatus.

4. The firefighting apparatus of claim 3, comprising:

a cover selectively disposable over the USB plug to conceal the USB plug, wherein the data regarding the firefighting apparatus includes at least one of an electrical diagram, a hydraulic diagram, a service manual, and a maintenance manual.

5. A firefighting apparatus comprising:

a frame including a plurality of wheels configured to enable transportation of the apparatus to an emergency location, the frame including a forward portion having a cab and a rearward portion rearward of the cab, the cab defining an interior having a driver space within which a driver of the firefighting apparatus is located during mobilization of the firefighting apparatus, a pump disposed in the rearward portion of the frame, the pump adapted to pump liquid through a firefighting hose;

a dashboard located within the interior of the cab and forwardly bounding the driver space, the dashboard including at least one of a display, a control and a gauge, the interior including a mounting panel, the mounting panel defining a mounting aperture;

a housing mounted in the mounting aperture and joined with the mounting panel, the housing including a sidewall, the sidewall bounding at least a portion of an interior compartment defined by the housing, the housing including an access opening providing access to the interior compartment, the housing being fixedly and permanently mounted in the interior so that the housing is not removable from the interior without the use of tools;

a flash memory device including non-volatile solid-state memory, the memory storing data regarding at least one of a service manual concerning the firefighting apparatus, a maintenance manual concerning the firefighting apparatus, an electrical diagram concerning the firefighting apparatus, a hydraulic diagram concerning the firefighting apparatus, and a troubleshooting guide concerning the firefighting apparatus, wherein the flash memory device is permanently mounted in the interior compartment of the housing, wherein the flash memory device is joined with a coupler adapted to electrically couple the flash memory device to a portable computing device so that the data can be selectively displayed on a display of the computing device to a user thereof, wherein the flash memory device is fully electronically isolated from all onboard operating systems of the firefighting apparatus, wherein the flash memory device is unpowered, and whereby the user can temporarily couple the portable computing device to the flash memory device via the coupler to selectively access and display the data regarding at least one of the service manual, the maintenance manual, the electrical diagram, the hydraulic diagram, and the troubleshooting guide, thereby enabling the user to perform work on the firefighting apparatus.

6. The firefighting apparatus of claim 5, wherein the coupler is a USB plug capable of being coupled to a USB socket of the portable computing device.

7. The firefighting apparatus of claim 6, wherein the housing is joined with a cover, the cover selectively disposable over the USB plug to conceal the USB plug.

8. The firefighting apparatus of claim 7, wherein housing includes a flange, wherein the flange extends outwardly from the sidewall, wherein the flange is fastened to the mounting panel to secure the housing in a fixed relationship relative to the dashboard, wherein the mounting panel is located in at least one of a lower portion of the dashboard, under the dashboard, distal from the dashboard, within the driver space, within the cab interior, and elsewhere in the firefighting apparatus.

9. The firefighting apparatus of claim 5, wherein the housing includes a bottom joined with the sidewall, wherein the access opening faces the driver's space, wherein the access opening is the only access to the interior compartment, wherein the is the flash memory device is installed in the interior compartment.

10. The firefighting apparatus of claim 9 wherein the flash memory device and the coupler are disposed entirely within the interior compartment without extending beyond the access opening.

11. The firefighting apparatus of claim 5, wherein the housing includes a threaded portion adjacent the access opening, wherein a cover including a corresponding threaded portion is threadably received on the threaded portion of the housing.

12. The firefighting apparatus of claim 5, wherein the data regarding the firefighting apparatus includes information concerning at least one of the pump, an engine, a transmission, a hydraulic system, and an electrical system of the firefighting apparatus.

13. The firefighting apparatus of claim 5, wherein the housing includes a forward portion that extends away from a rearward facing surface of the mounting panel, wherein the forward portion is selectively joined with a cover, wherein the cover is configured to close the access opening, thereby confining the flash memory device entirely within the interior compartment.

14. The firefighting apparatus of claim 13,
wherein the coupler is the only point of attachment to the flash memory device,
wherein the coupler is capable of electrically coupling to the portable computing device.

15. The firefighting apparatus of claim 5,
wherein the flash memory device is isolated so that the flash memory device is incapable of receiving any onboard operating data pertaining to the operation and status of the firefighting apparatus.

16. A firefighting apparatus comprising:
a frame including a plurality of wheels configured to enable transportation of the apparatus to an emergency location;
a pump disposed in a rearward portion of the frame, the pump adapted to pump liquid through a firefighting hose;
a cab mounted over at least one of the plurality of wheels, forward of the rearward portion, the cab defining an interior having a dashboard mounted forward of a driver space and a mounting panel;
a housing mounted in the interior, the housing including a sidewall, the sidewall bounding at least a portion of an interior compartment defined by the housing, the housing including an access opening providing access to the interior compartment, the housing being fixedly and permanently mounted to the mounting panel in the interior of the cab so that the housing is not removable from the mounting panel without the use of tools;
a flash memory device adapted to store data regarding at least one of a service manual concerning the firefighting apparatus, a maintenance manual concerning the firefighting apparatus, an electrical diagram concerning the firefighting apparatus, a hydraulic diagram concerning the firefighting apparatus, and a troubleshooting guide concerning the firefighting apparatus,
wherein the flash memory device is permanently mounted in the interior compartment of the housing, wherein the flash memory device configured so that a portable computing device can access the data so that the data can be selectively displayed on a display of the computing device to a user thereof,
wherein the flash memory device is incapable of receiving any onboard operating data pertaining to the operation and status of the firefighting apparatus and is fully electronically isolated from all onboard operating systems of the firefighting apparatus,
and whereby the user can, with the portable computing device, selectively access and display the data regarding at least one of the service manual, the maintenance manual, the electrical diagram, the hydraulic diagram, and the troubleshooting guide, thereby enabling the user to perform work on the firefighting apparatus.

17. The firefighting apparatus of claim 16,
wherein the mounting panel is located in at least one of a lower portion of the dashboard, under the dashboard, distal from the dashboard, within the driver space, and within the cab interior, and
wherein the flash memory device is accessible only within the interior of the cab,
wherein the data stored in the flash memory device includes information concerning at least one of the pump, an engine, a transmission, a hydraulic system, and an electrical system of the firefighting apparatus.

18. The firefighting apparatus of claim 16,
wherein the flash memory device is selectively concealed within the housing via a cover joined with the housing and extending over the access opening.

19. The firefighting apparatus of claim 18,
wherein the housing includes a forward portion that extends away from a front surface of the dashboard,
wherein the forward portion is selectively joined with the cover,
wherein the cover is configured to close the access opening, thereby confining the flash memory device entirely within the interior compartment.

20. The firefighting apparatus of claim 19,
wherein the flash memory device includes non-volatile solid-state memory,
wherein the flash memory device is joined with a coupler that is a USB plug, the USB plug joined with a USB socket of the portable computing device.

* * * * *